United States Patent
Hayashi et al.

(10) Patent No.: US 10,961,360 B2
(45) Date of Patent: *Mar. 30, 2021

(54) FIBER-REINFORCED RESIN MATERIAL AND MOLDED FIBER-REINFORCED RESIN BODY OBTAINED USING THE SAME

(71) Applicant: KOMATSU MATERE CO., LTD., Ishikawa (JP)

(72) Inventors: Yutaka Hayashi, Ishikawa (JP); Taketoshi Nakayama, Ishikawa (JP); Hiroyuki Yamada, Ishikawa (JP); Honami Noda, Ishikawa (JP)

(73) Assignee: KOMATSU MATERE CO., LTD., Ishikawa (JP)

( * ) Notice: Subject to any disclaimer, the term of this patent is extended or adjusted under 35 U.S.C. 154(b) by 51 days.

This patent is subject to a terminal disclaimer.

(21) Appl. No.: 15/109,483

(22) PCT Filed: Jan. 8, 2015

(86) PCT No.: PCT/JP2015/000059
§ 371 (c)(1),
(2) Date: Jul. 1, 2016

(87) PCT Pub. No.: WO2015/105051
PCT Pub. Date: Jul. 16, 2015

(65) Prior Publication Data
US 2016/0326323 A1    Nov. 10, 2016

(30) Foreign Application Priority Data
Jan. 10, 2014 (JP) .............................. JP2014-003364

(51) Int. Cl.
*C08J 5/04* (2006.01)
*C08J 5/24* (2006.01)

(52) U.S. Cl.
CPC ............. *C08J 5/042* (2013.01); *C08J 5/24* (2013.01); *C08J 2363/00* (2013.01)

(58) Field of Classification Search
CPC ....... C98J 5/24; C08J 5/24; C08J 5/042; C08J 2363/00
USPC ........................................................ 523/440
See application file for complete search history.

(56) References Cited

U.S. PATENT DOCUMENTS

| | | | |
|---|---|---|---|
| 4,764,397 A * | 8/1988 | Fischer | C08G 65/4056 156/176 |
| 2004/0213952 A1* | 10/2004 | Takemura | B29C 70/34 428/105 |
| 2006/0035088 A1 | 2/2006 | Takano et al. | |
| 2006/0035548 A1 | 2/2006 | Goto et al. | |
| 2008/0185753 A1 | 8/2008 | Takano et al. | |
| 2008/0185757 A1 | 8/2008 | Takano et al. | |
| 2008/0187718 A1 | 8/2008 | Takano et al. | |
| 2009/0104418 A1 | 4/2009 | Ohki et al. | |
| 2009/0123717 A1 | 5/2009 | Goto et al. | |
| 2009/0131556 A1 | 5/2009 | Honda et al. | |
| 2009/0202832 A1 | 8/2009 | Takano et al. | |
| 2009/0246468 A1 | 10/2009 | Schubiger | |
| 2010/0009116 A1* | 1/2010 | Takeda | B29C 70/16 428/114 |
| 2010/0009158 A1 | 1/2010 | Imaizumi et al. | |
| 2010/0040857 A1 | 2/2010 | Schubiger | |
| 2011/0064908 A1* | 3/2011 | Kweder | B29B 11/16 428/113 |
| 2011/0151206 A1 | 6/2011 | Goto et al. | |
| 2011/0184091 A1* | 7/2011 | Mizuki | C08G 59/4238 523/428 |
| 2012/0035299 A1 | 2/2012 | Arai et al. | |
| 2012/0276795 A1 | 11/2012 | Goto et al. | |
| 2012/0295504 A1* | 11/2012 | Miyauchi | B29C 70/46 442/179 |
| 2012/0302118 A1 | 11/2012 | Kasuya et al. | |
| 2013/0207293 A1 | 8/2013 | Sekido et al. | |
| 2013/0295811 A1 | 11/2013 | Shinmen et al. | |
| 2013/0344305 A1* | 12/2013 | Hatanaka | B32B 37/14 428/206 |
| 2014/0057514 A1 | 2/2014 | Goto et al. | |
| 2018/0155855 A1 | 6/2018 | Shinmen et al. | |

FOREIGN PATENT DOCUMENTS

| | | |
|---|---|---|
| CN | 101405342 | 4/2009 |
| CN | 102348735 | 2/2012 |
| CN | 102746622 | 10/2012 |
| CN | 102770480 | 11/2012 |
| CN | 103154336 | 6/2013 |

(Continued)

OTHER PUBLICATIONS

Polymerdatabase.com, http://polymerdatabase.com/polymers/polyvinylformal,html, 2016 (Year: 2016).*
Witzke, DE 102011006372 A1 machine translation in English, Oct. 4, 2012 (Year: 2012).*
Extended European Search Report dated Jun. 19, 2017 in corresponding European patent application No. 15 735 132.1.
International Search Report dated Apr. 7, 2015 in International Application No. PCT/JP2015/000059.

*Primary Examiner* — David T Karst
(74) *Attorney, Agent, or Firm* — Wenderoth, Lind & Ponack, L.L.P.

(57) ABSTRACT

A fiber-reinforced resin material includes a thermoplastic resin and a bundle of reinforced fibers arranged in one direction, the thermoplastic resin being a reactive resin. The thermoplastic resin may be an epoxy resin. The reinforced fibers may be carbon fibers. A molded fiber-reinforced resin body is obtained using the fiber-reinforced resin material. The molded fiber-reinforced resin body may be formed by the application of heat and pressure.

16 Claims, No Drawings

(56) References Cited

FOREIGN PATENT DOCUMENTS

| | | | |
|---|---|---|---|
| DE | 102011006372 A1 * | 10/2012 | ................ C08J 3/28 |
| EP | 3 006 611 | 4/2016 | |
| JP | H04-153007 | 5/1992 | |
| JP | 7-214714 | 8/1995 | |
| JP | 2004-142165 | 5/2004 | |
| JP | 2005-238758 | 9/2005 | |
| JP | 2006-321896 | 11/2006 | |
| JP | 2008-095066 | 4/2008 | |
| JP | 2011-516654 | 5/2011 | |
| JP | 2012-51225 | 3/2012 | |
| JP | 2012-196899 | 10/2012 | |
| JP | 2012-251043 | 12/2012 | |
| JP | 2013-213305 | 10/2013 | |
| JP | 2013-253215 | 12/2013 | |
| WO | 2004/009314 | 1/2004 | |
| WO | 2004/048435 | 6/2004 | |
| WO | 2007/020910 | 2/2007 | |
| WO | WO-2008/010823 A2 * | 1/2008 | ............. C08G 59/64 |
| WO | 2009/122259 | 10/2009 | |
| WO | WO-2012124450 A1 * | 9/2012 | ............. B32B 37/14 |

* cited by examiner

FIBER-REINFORCED RESIN MATERIAL AND MOLDED FIBER-REINFORCED RESIN BODY OBTAINED USING THE SAME

TECHNICAL FIELD

The present invention relates to a fiber-reinforced resin material and a molded fiber-reinforced resin body obtained using the same.

BACKGROUND ART

As a molded fiber-reinforced resin body obtained using reinforced fibers and a resin, a sheeted thermosetting prepreg (a thermosetting prepreg sheet) is known which is obtained using reinforced fibers, such as glass fibers, and a thermosetting resin, such as a thermosetting epoxy resin.

However, thermosetting prepreg sheets cannot be remolded. In addition, uncured sheets (sheets before thermosetting) need to be stored in, for example, a low-temperature storehouse. Furthermore, it takes many hours for uncured thermosetting resin to cure, which causes a problem in productivity.

Moreover, a molded fiber-reinforced body obtained using reinforced fibers and a thermoplastic resin is known which overcomes the aforementioned disadvantages.

The molded fiber-reinforced body including the thermoplastic resin is manufactured by agitating the thermoplastic resin and the reinforced fibers with an agitator, such as a screw agitator, in a manner that the individual axial directions of the reinforced fibers are randomly oriented in the thermoplastic resin. Such a molded body manufactured in this way hardly causes anisotropy in which the mechanical properties, such as strength and elastic modulus, are different depending on the direction.

However, reinforced fibers, such as carbon fibers, are broken and cut during the agitation of the thermoplastic resin and the reinforced fibers. This may possibly decrease the strength of the resulting molded body.

In view of this, a method is known by which a sheet comprising a bundle of carbon fibers oriented in one direction is interposed between two thermoplastic films and then melted by the application of heat at temperatures of 230° C. to 260° C. in a manner that the sheet comprising the bundle of carbon fibers is impregnated with the thermoplastic films to obtain a molded fiber-reinforced body (Patent Literature [PTL] 1).

It has been reported that this method has provided a molded fiber-reinforced resin body which is superior in the mechanical properties and the uniformity of the properties despite the low volume fraction of reinforced fibers.

CITATION LIST

Patent Literature

[PTL 1] WO 2007/020910

SUMMARY OF INVENTION

Technical Problem

However, by the method of obtaining the molded fiber-reinforced resin body by melting the thermoplastic resin by the application of heat, the impregnation of the reinforced fibers with the thermoplastic resin is insufficient. For this reason, the molded fiber-reinforced resin body cannot deliver sufficient strength. In addition, the impregnation of the reinforced fibers with the thermoplastic resin is not uniform.

As one method to address this problem, the carbon fibers may be impregnated sufficiently with the thermoplastic resin by opening the bundle of carbon fibers to reduce the thickness of the bundle. However, this is still not enough. As another method, the thermoplastic films may be sufficiently melted by the application of heat to increase a duration of contact between the thermoplastic films and the bundle of carbon fibers. However, this method may decrease productivity, increase production costs, and in addition, easily cause thermal alteration of the thermoplastic resin.

Thus, the present invention has an object to provide a fiber-reinforced resin material superior in productivity and a molded fiber-reinforced resin body obtained using the fiber-reinforced resin material and having stable strength.

Solution to Problem

As a result of keen examination to solve the aforementioned problems, the inventors have achieved the present invention.

To be more specific, the following are configurations (1) to (10) according to the present invention, for example.

(1) A fiber-reinforced resin material according to the present invention includes a thermoplastic resin and a bundle of reinforced fibers arranged in one direction, the thermoplastic resin being a reactive resin.

(2) In the fiber-reinforced resin material according to the present invention, the thermoplastic resin may be an epoxy resin.

(3) In the fiber-reinforced resin material according to the present invention, the reinforced fibers may be carbon fibers.

(4) The fiber-reinforced resin material according to the present invention may have a length of 5 mm to 500 mm in a fiber axial direction.

(5) The fiber-reinforced resin material according to the present invention may have a thickness of at least 0.15 mm.

(6) In the fiber-reinforced resin material according to the present invention, the bundle of reinforced fibers may include at least 1000 reinforced fibers.

(7) The fiber-reinforced resin material according to the present invention may have a fiber volume fraction (a Vf value) of 20% to 80%.

(8) A molded fiber-reinforced resin body according to the present invention is obtained using the fiber-reinforced resin material according to any one of (1) to (7) described above.

(9) A molded fiber-reinforced resin body according to the present invention Is obtained by applying heat and pressure to the fiber-reinforced resin material according to any one of (1) to (7) described above.

(10) The molded fiber-reinforced resin body according to the present invention may have a fiber volume fraction (a Vf value) of 20% to 80%.

Advantageous Effects of Invention

According to a fiber-reinforced resin material according to the present invention, reinforced fibers are impregnated sufficiently with a thermoplastic resin. Thus, a molded fiber-reinforced resin body having stable strength can be obtained.

Moreover, a molded fiber-reinforced body according to the present invention is formed using a fiber-reinforced resin material, and thus has stable strength.

DESCRIPTION OF EMBODIMENT

The following is a description of preferred embodiments according to the present invention. It should be noted that the present invention is not limited to these embodiments. Various changes and modifications are possible within the spirit and scope of the present invention.

<Fiber-Reinforced Resin Material>

A fiber-reinforced resin material according to Embodiment includes a thermoplastic resin and a bundle of reinforced fibers arranged in one direction, the thermoplastic resin being a reactive resin.

The fiber-reinforced resin material according to Embodiment, which includes the thermoplastic resin and the bundle of carbon fibers, is thermoplastic and thus can be easily formed by the application of heat and pressure even after curing once. Hence, a desired molded fiber-reinforced resin body can be obtained.

The fiber-reinforced resin material according to Embodiment may be in the form of one of, but not particularly limited to, a sheet, a tape, a pillar, a string, and a grain. Moreover, a cross section of the reinforced fiber that is cut in the direction perpendicular to the fiber axial direction of the reinforced fiber may be in the shape of one of, but not particularly limited to, a circle, an ellipse, and a polygon. Note that the term "the direction perpendicular to the fiber axial direction of the reinforced fiber" used here may refer to a direction nearly perpendicular to the fiber axial direction of the reinforced fiber.

Furthermore, the size of the fiber-reinforced resin material is not particularly limited to a certain size. In view of the strength of the fiber-reinforced resin material, such as fracture toughness, bending strength, impact resistance, and compressive strength, the length of the fiber-reinforced resin material in the fiber axial direction is preferably 5 mm to 500 mm. The length of the fiber-reinforced resin material in the fiber axial direction is more preferably 10 mm or more, or even more preferably 20 mm or more. The length of the fiber-reinforced resin material in the fiber axial direction is more preferably 30 mm or more, even more preferably 40 mm or more, or even more preferably more than 50 mm.

Moreover, an upper limit of the length of the fiber-reinforced resin material in the fiber axial direction is not particularly limited to a certain length. However, with the upper limit of 500 mm or less, the anisotropy related to the strength of the molded fiber-reinforced resin body obtained using the fiber-reinforced resin material can be reduced. Thus, the molded fiber-reinforced resin body having the stable strength including compressive strength and impact resistance can be obtained. The length of the fiber-reinforced resin material in the fiber axial direction is preferably 300 mm or less, or more preferably 100 mm or less.

It should be noted that the expression "the length of the fiber-reinforced resin material in the fiber axial direction" refers to the length of the reinforced fiber, which is a component of the fiber-reinforced resin material, in the fiber axial direction.

A length of the fiber-reinforced resin material in a direction other than the fiber axial direction is not particularly limited to a certain length. However, the length is preferably shorter than the length in the fiber axial direction, in view of the productivity of the fiber-reinforced resin material and the strength of the resulting molded fiber-reinforced resin body.

Furthermore, a width of the fiber-reinforced resin material is preferably 300 mm or less, more preferably 100 mm or less, even more preferably 50 mm or less, even more preferably 30 mm or less, even more preferably 10 mm or less, or even more preferably 5 mm or less. Although a lower limit of the width of the fiber-reinforced resin material is not particularly limited to a certain width, the width of the fiber-reinforced resin material is preferably 1 mm or more.

When the width of the fiber-reinforced resin material is equal to or less than the stated upper limit, it is easy for the bundles of reinforced fibers to be randomly oriented in the fiber axial direction in the molded fiber-reinforced resin body obtained by the application of heat and pressure. Thus, in view of the strength and stability of the resulting molded fiber-reinforced resin body, the upper limit of the width of the fiber-reinforced resin material may be set at the aforementioned value.

As a relationship between the length of the fiber-reinforced resin material in the fiber axial direction and the width of the fiber-reinforced resin material, it is desired that the length in the fiber axial direction is greater than the width. Assuming that the width of the fiber-reinforced resin material is 1, the length in the fiber axial direction is preferably 1.5 or more, more preferably 2.0 or more, even more preferably 3.0 or more, even more preferably 4.0 or more, or even more preferably 5.0 or more.

When the relationship between the length of the fiber-reinforced resin material in the fiber axial direction and the width of the fiber-reinforced resin material is represented by the aforementioned lower limit or more, the fiber-reinforced resin materials intricately overlap one another in the molded fiber-reinforced resin body not only in the plane direction but also in the thickness direction and thus are randomly oriented in three dimensions. This increases the strength, and particularly enhances the compressive strength in the case of a thick molded body. In addition, in the event of an accidental fracture of a thin molded body, the safety of a cut surface of the thin molded body increases as described later. The enhanced compressive strength is believed to result from that movement of the fiber-reinforced resin materials due to compression is suppressed because the fiber-reinforced resin materials randomly overlap one another in three dimensions.

Moreover, an upper limit of the relationship between the length of the fiber-reinforced resin material in the fiber axial direction and the width of the fiber-reinforced resin material is represented as follows. Assuming that the width of the fiber-reinforced resin material is 1, the length in the fiber axial direction is preferably 50.0 or less, more preferably 30.0 or less, or even more preferably 20.0 or less.

When a value representing the relationship between the length of the fiber-reinforced resin material in the fiber axial direction and the width of the fiber-reinforced resin material exceeds the aforementioned upper limit, the productivity and the strength stability of the molded fiber-reinforced resin body may be possibly reduced.

Furthermore, a thickness of the fiber-reinforced resin material according to Embodiment is not particularly limited to a certain thickness. However, the thickness is preferably 0.10 mm or more, more preferably 0.15 mm or more, even more preferably 0.20 mm or more, even more preferably 0.3 mm or more, even more preferably 0.5 mm or more, or even more preferably 1.0 mm or more. An upper limit of the thickness of the fiber-reinforced resin material is about 10 mm.

When the thickness of the fiber-reinforced resin material is equal to or more than the aforementioned lower limit, the handling ability of the resulting fiber-reinforced resin material enhances. The use of carbon fibers or basalt fibers as the reinforced fibers allows the strength to be anisotropic. Thus, when the thickness of the fiber-reinforced resin material is less than the aforementioned lower limit, the fiber-reinforced resin material may be possibly fractured before the molded fiber-reinforced resin body is manufactured. The thickness of the fiber-reinforced resin material is preferably equal to or more than the aforementioned lower limit, in view of the following: the productivity of the fiber-reinforced resin material; the strength that is increased when the fiber-reinforced resin materials change the shapes in the thickness or width direction to fill clearances between the fiber-reinforced resin materials in manufacturing of the molded fiber-reinforced resin body using the fiber-reinforced resin materials by the application of heat and pressure; and the stability of the strength.

Moreover, when the thickness of the fiber-reinforced resin material is equal to or less than the aforementioned upper limit, the thermoplastic resin can be sufficiently impregnated deep into the bundle of carbon fibers. The thickness of the fiber-reinforced resin material is preferably equal to or less than the aforementioned upper limit, in view of the following: the productivity of the fiber-reinforced resin material; and the strength of the molded fiber-reinforced resin body obtained using the fiber-reinforced resin materials. Furthermore, when the thickness of the fiber-reinforced resin material is equal to or less than the aforementioned upper limit, inclusion of air into the molded fiber-reinforced resin body during manufacturing by the application of heat and pressure can be reduced. Thus, the strength and the productivity are stabilized.

It is difficult for a bundle of reinforced fibers to be impregnated with a thermoplastic resin that is used after being melted by heat. For this reason, the bundle of reinforced fibers needs to be formed into a thin sheet having a thickness of 0.13 mm or less. However, since the fiber-reinforced resin material according to Embodiment includes a thermoplastic resin that is reactive as a raw material before being processed, a bundle of reinforced fibers is easily impregnated with this thermoplastic resin. More specifically, the bundle of reinforced fibers does not need to be thin, and a thick fiber-reinforced resin material can be thus obtained.

Moreover, it is preferable that a fiber volume fraction (a Vf value) of the fiber-reinforced resin material according to Embodiment is 20% to 80%. In view of the strength of the molded fiber-reinforced resin body obtained using this fiber-reinforced resin material, the Vf value of the fiber-reinforced resin material is more preferably 30% or more, or even more preferably 40% or more. Furthermore, in view of the external appearance quality, formability, and strength of the molded fiber-reinforced resin body obtained using the fiber-reinforced resin material, the Vf value of the fiber-reinforced resin material is more preferably 70% or less, or even more preferably 60% or less.

When a space is caused between the fiber-reinforced resin materials as a result of the application heat and pressure to the fiber-reinforced resin materials to obtain the molded fiber-reinforced resin body, the Vf value of the fiber-reinforced resin material is preferably 50% or less, or more preferably 45% or less, depending on the shape of the fiber-reinforced resin material. This is because such a molded fiber-reinforced resin body having the space between the fiber-reinforced resin materials in the molded fiber-reinforced resin body may possibly have a reduced strength or an unstable strength.

<<Thermoplastic Resin>>

Examples of the thermoplastic resin according to Embodiment include epoxy resin, polyamide resin, acrylic resin, polyphenylene sulfide resin, polyvinyl chloride resin, polyethylene, polypropylene, polyacetal resin, polycarbonate, polyurethane, polybutylene terephthalate, acrylonitrile butadiene styrene (ABS) resin, modified polyphenylene ether resin, phenoxy resin, polysulfone, polyether sulfone, polyether ketone, polyether ether ketone, and aromatic polyester. To be more specific, the thermoplastic resin according to Embodiment is a reactive resin that cures when its reaction is, for example, started or promoted by the addition of a curing agent, such as a cross-linker, a catalyst, a polymerization initiator, or a polymerization accelerator, or by the application of heat. The thermoplastic resin according to Embodiment is thermoplastic even after curing. It is preferable that the thermoplastic resin has a liner molecular structure. Moreover, different kinds of resins may be combined to be used as the thermoplastic resin.

The thermoplastic resin may change in the chemical structure after the reaction. As an example, an epoxy resin becomes a phenoxy resin after the reaction. A thermosetting resin may be combined with the thermoplastic resin within the scope of the object of the present invention.

The molded fiber-reinforced resin body obtained using such a thermoplastic resin can be easily changed in shape by the application of heat even after molding. Furthermore, the recycling of the molded fiber-reinforced resin body is easy.

In view of the strength, such as fracture toughness, bending strength, impact resistance, and compressive strength, and the durability including chemical resistance, such as acid resistance and alkali resistance, a reactive thermoplastic epoxy resin is particularly preferable as the reactive thermoplastic resin. Moreover, in the case where carbon fibers are used as the reinforced fibers, the reactive thermoplastic epoxy resin is also preferable in view of the affinity for the carbon fibers. In this case, the strength and durability of the molded fiber-reinforced resin body obtained using the fiber-reinforced resin material are more enhanced. Note that examples of the reactive thermoplastic epoxy resin according to Embodiment include an epoxy resin that becomes a phenoxy resin after the reaction.

The reactive thermoplastic resin described above can be in a liquid state at ordinary temperatures or can be dissolved or dispersed with a solvent, before being cured with a curing agent. Thus, the resin can be impregnated deep into the bundle of reinforced fibers. Moreover, the presence of the resin inside the bundle of reinforced fibers allows the reinforced fibers and the thermoplastic resin to sufficiently intertwine with each other (contact each other). Hence, the molded fiber-reinforced resin body obtained using the fiber-reinforced resin material according to Embodiment has a superior strength and, in addition, a stable strength with reduced variations.

Furthermore, as compared with an unreacted thermoplastic resin that is used after being dissolved by the application of heat, the reactive thermoplastic resin has a lower molecular weight before the reaction and thus is highly fluid. After the reaction, the reactive thermoplastic resin can be highly polymerized to 10000 or more to 30000 or more as the number average molecular weight. Moreover, the state of cross-linking can be adjusted, and the strength can be enhanced. In addition, the flexibility and heat distortion property of the reactive thermoplastic resin can also be adjusted.

A glass-transition temperature of the thermoplastic resin is preferably 90° C. to 200° C. In view of the thermal stability of the resulting molded fiber-reinforced resin body, the glass-transition temperature of the thermoplastic resin is preferably 95° C. or higher. In view of the formability of the resulting molded fiber-reinforced resin body, the glass-transition temperature of the thermoplastic resin is preferably 170° C. or lower, or more preferably 150° C. or lower. Note that the glass-transition temperature is measured by a differential scanning calorimetry (DSC) method.

<<Bundle of Reinforced Fibers>>

Examples of the reinforced fiber according to Embodiment include an inorganic fiber, an organic fiber, a metal fiber, and a combination of these fibers. To be more specific, the examples of the reinforced fiber include a carbon fiber, a graphitic fiber, a silicon carbide fiber, an alumina fiber, a tungsten carbide fiber, a boron fiber, a glass fiber, a basalt fiber, a para-aramid fiber, a meta-aramid fiber, an ultrahigh molecular weight polyethylene fiber, a polyarylate fiber, a PBO (poly-p-phenylene benzoxazole) fiber, a polyphenylene sulfide (PPS) fiber, a polyimide fiber, a fluorine fiber, a polyvinyl alcohol fiber (PVA fiber), stainless, and iron.

In view of the lightness and the high strength, the reinforced fiber is preferably a carbon fiber or a basalt fiber, and particularly preferably a carbon fiber.

Either a PAN-based carbon fiber or a pitch-based carbon fiber can be used. In view of the balance between the strength and the elastic modulus, the PAN-based carbon fiber is preferable.

In Embodiment, the reinforced fibers are arranged in one direction in a bundle. Here, the reinforced fibers arranged in one direction refer to the reinforced fibers which have the fiber axial directions aligned in the same direction. Moreover, the reinforced fibers in a bundle may refer to at least two reinforced fibers that are tied in a bundle. The reinforced fibers may be tied with or without a sizing agent. In view of the productivity, the reinforced fibers are preferably tied with a sizing agent. In this case, a sizing agent that has a high affinity for the thermoplastic resin is preferably used. Such an agent enables the thermoplastic resin to be easily impregnated into the bundle of reinforced fibers. As a result, the molded fiber-reinforced resin body that is superior and stable in strength can be easily obtained.

The bundle of reinforced fibers arranged in one direction is a bundle of preferably at least 1000 reinforced fibers, more preferably at least 10000 reinforced fibers, or even more preferably at least 100000 reinforced fibers. An upper limit of a count of reinforced fibers in the bundle is not particularly limited to a certain count. However, for an unopened bundle of reinforced fibers, the upper limit is about one million fibers. For an opened bundle of reinforced fibers arranged in one direction, the upper limit may be higher.

Thus, in Embodiment, a product of a bundle of 6000 (6K), 12000 (12K), or 24000 (24K) carbon fibers supplied by a carbon-fiber manufacturer can be used without being, for example, opened. Alternatively, a plurality of such bundles can be used without being opened. This results in superior productivity. It should be obvious that a product of a bundle of carbon fibers supplied by a carbon-fiber manufacturer may be opened for use.

The carbon fiber may be a non-twisted yarn, a twisted yarn, or an untwisted yarn.

In Embodiment, a cross section of the bundle of carbon fibers that is cut in the direction perpendicular to the fiber axial direction of the bundle may be in the shape of one of, but not particularly limited to, a circle, an ellipse, and a polygon. Note that the term "the direction perpendicular to the fiber axial direction" used here may refer to a direction nearly perpendicular to the fiber axial direction of the reinforced fiber (carbon fiber).

In Embodiment, since the thermoplastic resin that is reactive before being processed is used as a raw material, the inside of the bundle of reinforced fibers is easily impregnated with this resin. On this account, the bundle of reinforced fibers including a large count of fibers does not necessarily need to be, for example, opened. More specifically, the reinforced fibers wound around, for instance, a drum that is supplied by a fiber manufacturer can be used without being processed. Thus, the reinforced fibers require only a small number of processes and are superior in productivity. Furthermore, the bundle of reinforced fibers comprising a large count of fibers can be impregnated with the thermoplastic resin at one time, and thus is superior in productivity.

<Method of Manufacturing Fiber-Reinforced Resin Material>

Next, the following describes a preferred method of manufacturing a fiber-reinforced resin material according to Embodiment. The method of manufacturing a fiber-reinforced resin material according to Embodiment is not limited to the method described below. In the following, explanations on the matters described above may be partially omitted or simplified to avoid repetition.

The fiber-reinforced resin material according to Embodiment is obtained as follows. The aforementioned bundle of reinforced fibers, which are arranged in one direction and wound on a drum or the like that is supplied by a fiber manufacturer such as a carbon-fiber manufacturer, is drawn from the drum or the like. After this, the bundle is applied with a thermoplastic resin solution to obtain the fiber-reinforced resin material. Here, the bundle of reinforced fibers drawn from one drum that is supplied by, for example, a carbon-fiber manufacturer may be used. Alternatively, a plurality of drums may be placed on a creel and then a plurality of bundles of reinforced fibers may be tied to be used as one bundle of reinforced fibers.

The thermoplastic resin solution includes at least a solvent and a curing agent for melting and dispersing various kinds of reactive thermoplastic resin including the current thermoplastic resin, as described above. The thermoplastic epoxy resin is as described above. Note that examples of the thermoplastic resin solution include not only a solution in which a solute is completely dissolved in a solvent, but also an emulsion and a dispersion.

Examples of the solvent include water, dimethylformamide, toluene, xylene, cyclohexane, methyl acetate, ethyl acetate, butyl acetate, acetone, methyl ethyl ketone, methyl isobutyl ketone, diisobutyl ketone, cyclohexanone, methanol, ethanol, butanol, isopropyl alcohol, methyl cellosolve, cellosolve, and anone.

Examples of the curing agent include a cross-linker, a catalyst, a polymerization initiator, and a polymerization accelerator. Examples of the epoxy resin include aliphatic polyamine, polyaminoamide, ketimine, aliphatic diamine, aromatic diamine, imidazole, and amine-based compound such as tertiary amine, phosphate compound, acid-anhydride-based compound, mercaptan-based compound, phenolic resin, amino resin, dicyandiamide, and Lewis acid complex compound.

Furthermore, an additive, such as antioxidant, ultraviolet absorber, pigment, thickener, emulsifier, or dispersant, may be added to the thermoplastic resin solution within the scope of the object of the present invention.

A viscosity of the thermoplastic resin solution according to Embodiment may be 5 mPa·s to 1000 mPa·s. With the solution having the viscosity of 5 mPa·s or more, the bundle of reinforced fibers can be applied with a sufficient amount of the thermoplastic resin. The viscosity of the thermoplastic resin solution is preferably 10 mPa·s or more, or more preferably 50 mPa·s or more. With the thermoplastic resin solution having the viscosity of 1000 mPa·s or less, the thermoplastic resin can be impregnated deep into the bundle of reinforced fibers. The viscosity of the thermoplastic resin solution is more preferably 800 mPa·s or less, or even more preferably 500 mPa·s or less.

Examples of the method of impregnating the bundle of reinforced fibers with the thermoplastic resin include the following: a dip method by which the bundle of reinforced fibers is dipped into the thermoplastic resin solution; a dip-nip method by which, after being dipped into the solution, the bundle of reinforced fibers is squeezed with, for example, a mangle; a transfer method by which the thermoplastic resin solution is caused to adhere to a kiss roll, a gravure roll, or the like and the thermoplastic resin is then transferred from, for example, the kiss roll onto the bundle of reinforced fibers; and a spray method by which the thermoplastic resin solution in the form of a mist is sprayed onto the bundle of reinforced fibers. The dip method, the transfer method, or the spray method, for example, allows the bundle of reinforced fibers to which the thermoplastic resin solution has adhered to contact an orifice, a die, a roll, or the like. As a result of this, the thermoplastic resin can be squeezed deep into the bundle of reinforced fibers, or an excess thermoplastic resin can be removed to adjust the amount of thermoplastic resin to be impregnated into the bundle of reinforced fibers.

The amount of the thermoplastic resin solution adhered to the reinforced fibers or the amount of the thermoplastic resin included in the thermoplastic resin solution may be adjusted in a manner that the amount of the thermoplastic resin impregnated into the bundle of reinforced fibers corresponds with the aforementioned favorable Vf value.

In Embodiment, the viscosity of the thermoplastic resin solution is low. On this account, even when the thermoplastic resin is applied to only one side of the bundle of reinforced fibers by the transfer method, the thermoplastic resin can be impregnated deep into the bundle of reinforced fibers. It should be obvious that the thermoplastic resin may be applied to both sides of the bundle of reinforced fibers by the transfer method.

After the thermoplastic resin is applied to the bundle of reinforced fibers, drying and/or heat treatment are/is performed. Drying and heat treatment may be performed at the same time. The thermoplastic resin may be caused to react completely at a time of obtaining the fiber-reinforced resin material. Alternatively, assuming that the reaction stops at a certain level (or that a reaction rate decreases), the thermoplastic resin may be caused to react completely when the molded fiber-reinforced resin body is manufactured.

Drying or heat treatment is performed after the thermoplastic resin is applied to the bundle of reinforced fibers, for the purpose of eliminating a tuck caused at least on the surface of the fiber-reinforced resin material. The elimination of the tuck on the surface of the fiber-reinforced resin material enhances handling in a process of manufacturing the fiber-reinforced resin material, and thus is preferable in view of the productivity. Furthermore, the molded fiber-reinforced resin body with no anisotropy can be easily obtained using such a fiber-reinforced resin material. In addition, handling in a process of manufacturing the molded fiber-reinforced resin body is also enhanced, and thus is preferable in view of the productivity.

A drying temperature and a heat treatment temperature depend on a thermoplastic resin, a curing agent, or a solvent. In the case of epoxy resin, drying may be performed preferably at 40° C. to 120° C. for about 1 minute to 1 hour, and heat treatment may be performed preferably at 120° C. to 250° C. for about 1 minute to 1 hour. More preferably, drying may be performed at 50° C. to 100° C. for about 10 minutes to 30 minutes, and heat treatment may be performed at 120° C. to 180° C. for about 3 minutes to 40 minutes. Such ranges of conditions are preferable in view of the quality and productivity of the resulting molded fiber-reinforced resin body.

After the application of the thermoplastic resin to the bundle of carbon fibers followed by drying and/or heat treatment, the bundle of reinforced fibers applied with the thermoplastic resin is cut. As a result, the fiber-reinforced resin material can be obtained.

The bundle of reinforced fibers applied with the thermoplastic resin is cut in the direction perpendicular to the fiber axial direction of the bundle of reinforced fibers arranged in one direction. Note that the term "the direction perpendicular" used here may refer to a direction nearly perpendicular to the fiber axial direction of the reinforced fiber, instead of a direction precisely perpendicular to the fiber axial direction. The length of the cut fiber-reinforced resin material is as described above.

Moreover, when the bundle of reinforced fibers applied with the thermoplastic resin is in the form of, for example, a sheet or a pillar, the bundle of reinforced fibers may be cut in a direction parallel to the fiber axial direction as necessary.

<Molded Fiber-Reinforced Resin Body>

Next, the molded fiber-reinforced resin body according to Embodiment is described. Note that explanations on the matters described above may be partially omitted or simplified to avoid repetition.

The molded fiber-reinforced resin body according to Embodiment is obtained using the fiber-reinforced resin material described above. It is preferable that the molded fiber-reinforced resin body is formed by the application of heat and pressure to the fiber-reinforced resin material described above.

To be more specific, the molded fiber-reinforced resin body according to Embodiment includes the fiber-reinforced resin material that has a thermoplastic resin and a strip bundle of reinforced fibers (reinforced-fiber bundle) arranged in one direction. The molded fiber-reinforced resin body has a multilayer structure in which strip bundles of reinforced fibers randomly overlap one another in three dimensions. The structure of the randomly-layered strip bundles of reinforced fibers allows the molded body to be superior in impact resistance and fracture toughness.

Here, the multilayer structure having the strip reinforced-fiber bundles in each of which the reinforced fibers are arranged in one direction and which randomly overlap one another in three dimensions refers to the following. In the multilayer structure, a plurality of strip reinforced-fiber bundles, each of which is obtained by arranging a plurality of reinforced fibers in one direction, are arranged in a manner that the fiber axial directions of the bundles are random in the plane direction of the molded fiber-reinforced resin body and that the strip reinforced-fiber bundles overlap one another in the thickness direction of the molded fiber-reinforced resin body. To be more specific, in the multilayer structure, the strip reinforced-fiber bundles partially overlap one another in a manner that the fiber axial directions of the bundles are random on top surfaces and under surfaces of the bundles and that the bundles overlap one another and are slightly tilted randomly with respect to the plane direction of the molded fiber-reinforced resin body.

As described above, the fiber-reinforced resin material included in the molded fiber-reinforced resin body according to Embodiment is a bundle of a plurality of reinforced fibers which are arranged in one direction. In the bundle of the plurality of reinforced fibers which are arranged in one direction, the fiber axial directions of these reinforced fibers included in the bundle of reinforced fibers are aligned in the same direction. Thus, as long as the axial directions of the reinforced fibers included in the bundle are nearly the same, the bundle of reinforced fibers or the reinforced fibers included in the bundle may be curved or meandering. The molded fiber-reinforced resin body formed by the application of heat and pressure in particular may have, in many cases, the reinforced fibers or the bundles of reinforced fibers that are curved or meandering depending on a concavo-convex shape of the molded body and interlacing of the reinforced fibers and the bundles. Note that a concept of the strip reinforced-fiber bundles layered randomly in three dimensions includes such deformed reinforced fibers and reinforced-fiber bundles that are curved or meandering due to the application of, for example, pressure.

The fiber-reinforced resin material included in the molded fiber-reinforced resin body according to Embodiment includes the thermoplastic resin and the bundle of reinforced fibers, and thereby is thermoplastic. Thus, even after the fiber-reinforced resin material is cured once to form the molded fiber-reinforced resin body, the shape of the molded fiber-reinforced resin body can be easily changed into any shape by the application of heat and pressure to the molded fiber-reinforced resin body.

Note that the strip bundles of reinforced fibers included in the molded fiber-reinforced resin body do not necessarily have to be tilted with respect to the plane direction of the molded fiber-reinforced resin body. The strip bundles of reinforced fibers may include a bundle that is not tilted with respect to the plane direction of the molded fiber-reinforced resin body. Furthermore, the fiber-reinforced resin material included in the molded fiber-reinforced resin body may contain, for example, a catalyst, an antioxidant, and a pigment, besides the reinforced fibers and the thermoplastic resin.

As described above, the molded fiber-reinforced resin body according to Embodiment is obtained using a plurality of fiber-reinforced resin materials, in which the bundles of reinforced fibers arranged in one direction are random in the fiber axial direction. Thus, the anisotropy of the molded fiber-reinforced resin body is reduced. More specifically, although the reinforced fibers are arranged in one direction in each bundle, the bundles of reinforced fibers included in the molded fiber-reinforced resin body are random in the fiber axial direction. On this account, in the molded fiber-reinforced resin body as a whole, the reinforced fibers are random in the fiber axial direction.

Hence, the molded fiber-reinforced resin body has no anisotropy and thus can exhibit uniform strength in every direction.

The molded fiber-reinforced resin body obtained by layering carbon fiber cloths is susceptible to fracture when applied with a great force. In addition, a fracture surface of a broken part has a sharp edge, and such a fracture surface is easily exposed. For this reason, an accidental fracture of the molded fiber-reinforced resin body may possibly cause secondary damage, such as a cut on a human body because of the fracture surface.

On the other hand, the molded fiber-reinforced resin body according to Embodiment includes the fiber-reinforced resin material in which the bundles of reinforced fibers arranged in one direction are random in the fiber axial direction. Thus, even in the event of fracture resulting from a great force on the molded body, a fracture surface is less sharp and a sharp fracture surface is less likely to be exposed. This can reduce the occurrence of the aforementioned secondary damage. Hence, the molded fiber-reinforced resin body superior in safety can be obtained.

With the fiber-reinforced resin material and the reinforced fiber having the lengths no less than 10 mm and no more than 30 mm in particular, the molded fiber-reinforced resin body is susceptible to fracture when applied with a great force above a certain level and, when fractured, hardly causes a sharp fracture surface. With the fiber-reinforced resin material and the reinforced fiber having the lengths of 30 mm or more, or more preferably 40 mm or more, the molded fiber-reinforced resin body resists fracture even under a stronger impact and, when fractured, hardly causes a sharp fracture surface. Thus, depending on the lengths of the fiber-reinforced resin material and the reinforced fiber, the characteristics of the resulting molded fiber-reinforced resin body can be adjusted.

The molded fiber-reinforced resin body according to Embodiment may be in the form of one of, but not particularly limited to, a sheet, a plate, a block, and a direct purposeful shape such as a television housing. Alternatively, the molded fiber-reinforced resin body may be previously manufactured in the form of a sheet, and may be changed into a purposeful shape at any time later.

Moreover, the molded fiber-reinforced resin body according to Embodiment includes a thermoplastic resin. Thus, the application of heat and pressure to the fiber-reinforced resin material allows any molded body to be easily manufactured.

Furthermore, it is preferable that the fiber volume fraction (the Vf value) of the fiber-reinforced resin material according to Embodiment is 30% to 80%. In view of the strength of the molded fiber-reinforced resin body obtained using the fiber-reinforced resin material, the Vf value of the fiber-reinforced resin material is more preferably 40% or more, or even more preferably 50% or more. Moreover, in view of the external appearance quality and formability of the molded fiber-reinforced resin body obtained using the fiber-reinforced resin material, the Vf value is preferably 70% or less, or even more preferably 60% or less.

As described above, when a space is caused between the fiber-reinforced resin materials in the molded fiber-reinforced resin body, the Vf value of the fiber-reinforced resin material is preferably 50% or less, or more preferably 45% or less, not to cause any space. This is because such a molded fiber-reinforced resin body having the space between the fiber-reinforced resin materials in the molded fiber-reinforced resin body may possibly have a reduced strength.

Moreover, a small Vf value of the molded fiber-reinforced resin body may possibly reduce the strength of the molded fiber-reinforced resin body. When the molded fiber-reinforced resin body is required to have a high strength, an excess thermoplastic resin may be removed to raise the Vf value at the application of heat and pressure to obtain the molded fiber-reinforced resin body as described later.

In other words, the Vf value of the molded fiber-reinforced resin body is preferably greater than the Vf value of the fiber-reinforced resin material.

Furthermore, the thickness of the molded fiber-reinforced resin body according to Embodiment can be set to any thickness in accordance with the purpose of an intended molded body and may be, but not particularly limited to, 0.1 mm to 1000 mm, for example. Moreover, the vertical and horizontal lengths of the molded fiber-reinforced resin body according to Embodiment are not particularly limited to certain lengths and may be set to any lengths corresponding to the purpose of an intended molded body.

The molded fiber-reinforced resin body according to Embodiment includes the reactive thermoplastic resin, which penetrates more into the bundle of reinforced fibers included in the fiber-reinforced resin material of the molded fiber-reinforced resin body than a thermoplastic resin that is used after being melted by heat. Hence, the molded fiber-reinforced resin body having a superior strength and exhibiting a stable strength can be obtained.

Moreover, unlike a thermosetting resin, the molded fiber-reinforced resin body according to Embodiment can be changed in shape even after curing. In addition, unlike a thermosetting epoxy resin, the molded fiber-reinforced resin body according to Embodiment is convenient to use because the molded body does not require low-temperature storage or storage time before the completion of molding. Furthermore, the molded fiber-reinforced resin body according to Embodiment does not require a long cure time, and is thus preferable in view of the productivity.

Moreover, the molded fiber-reinforced resin body according to Embodiment, which has a strength and is lightweight, can be used in various products and applications that have been manufactured and achieved using metals, such as iron, and resins, such as polypropylene. Examples of such products and applications include the following: automobile parts, such as an automobile chassis; building materials, such as a reinforcing iron bar, a pillar, a beam, a spacer, and a jack plate; and housings of electrical appliances, such as a television, a personal computer, and a refrigerator.

In view of, for example, durability, light weight, high strength, and rust resistance, the molded fiber-reinforced resin body including carbon fibers as the reinforced fibers and an epoxy resin as the thermoplastic resin is more preferable.

<Method of Manufacturing Molded Fiber-Reinforced Resin Body>

Next, the following describes a preferred method of manufacturing a molded fiber-reinforced resin body according to Embodiment. The method of manufacturing a molded fiber-reinforced resin body according to Embodiment is not limited to the method described below. In the following, explanations on the matters described above may be partially omitted or simplified to avoid repetition.

The molded fiber-reinforced resin body according to Embodiment is obtained by forming the aforementioned fiber-reinforced resin material according to Embodiment into any shape by the application of heat and pressure.

Examples of the method of applying heat and pressure include a die pressing method, an autoclave method, and a heating-cooling press method. To be more specific, a plurality of fiber-reinforced resin materials according to Embodiment are layered in a mold in a manner that the reinforced-fiber bundles included in the fiber-reinforced resin materials are random in the fiber axial direction. Here, the reinforced fibers in each bundle are arranged in one direction. These layered bundles are applied with heat and pressure while air is being removed from the mold, and are subsequently cooled down.

A heating temperature, a pressure to be applied, and a pressure time depend on the thermoplastic resin and reinforced fibers to be used, the fiber-reinforced resin material, and the thickness of the molded fiber-reinforced resin body. The heating temperature is about 150° C. to 400° C., for example. The pressure to be applied is about 1 MPa to 50 MPa, for example. The pressure time is about 1 minute to 24 hours, for example.

Moreover, although the molded fiber-reinforced resin body may be manufactured in the shape of a flat sheet by the aforementioned methods, a continuation method may also be used.

Assume that a molded fiber-reinforced resin body in the shape of a thick block or a molded fiber-reinforced resin body in the concavo-convex shape is manufactured using the molded fiber-reinforced resin body in the shape of a flat sheet. In accordance with an intended shape or purpose, one or more flat-sheet molded fiber-reinforced resin bodies, which are layered, may be used. As described above, such a molded body or layered molded bodies in, for example, a mold, may be applied with heat and pressure while air is being removed from the mold, and subsequently cooled down.

EXAMPLES

The following describes more about the present invention according to Examples. Note that the present invention is not limited to these examples. Note also that the term "parts" refers to "parts by mass" in Examples below.

Example 1

In Example 1, as the bundle of reinforced fibers which are arranged in one direction, a bundle of 24000 carbon fibers was used (PAN-based carbon fibers: Torayca [registered trademark] T700SC manufactured by Toray Industries, Inc.).

The bundle of carbon fibers was drawn, without fiber opening processing, from a drum having this bundle of carbon fibers wound thereon, and a thermoplastic resin solution described below is applied to one surface of the bundle of carbon fibers using a kiss roll. A cross section of the bundle of carbon fibers drawn from the drum was in the shape resembling that of a flattened rugby ball.

| [Thermoplastic Resin Solution (Viscosity: 80 mPa · s)] | |
|---|---|
| thermoplastic epoxy resin (reactive resin: DENATITE TPEP-AA-MEK-05B manufactured by Nagase ChemteX Corporation) | 100 parts |
| curing agent (XNH6850RIN-K manufactured by Nagase ChemteX Corporation) | 6.5 parts |
| methyl ethyl ketone | 10 parts |

Next, the bundle of carbon fibers applied with the thermoplastic resin solution was squeezed by contact with four rolls (the top surface and under surface of the bundle of the carbon fibers alternately contacted with the corresponding rolls, each of the surfaces contacting the rolls twice). After this, the bundle was dried at 60° C. for 20 minutes and subsequently heat-treated at 150° C. for 20 minutes. As a result of this, the fiber-reinforced resin material in the form of a tape was obtained. This fiber-reinforced resin material had a length of 50 m, a width of 4 mm, and a thickness of 0.38 mm, and had the bundle of reinforced fibers arranged in one direction and applied with the reactive thermoplastic resin. The glass-transition temperature of the thermoplastic resin was 100° C.

Next, the fiber-reinforced resin material in the form of a tape was cut in the direction nearly perpendicular to the axial direction of the carbon fibers in a manner that each cut had a length of 40 mm to 50 mm. As a result, 1400 cuts of fiber-reinforced resin material in the form of chips were obtained. Each cut had a length of 40 mm to 50 mm, a width of 4 mm, and a thickness of 0.38 mm, and had a cross section in the shape resembling that of a flattened rugby ball. The Vf value of the obtained fiber-reinforced resin material was 45%. Note that the length of the carbon fiber in the obtained fiber-reinforced resin material was 40 mm to 50 mm, which was the same as the length of the fiber-reinforced resin material since the carbon fiber was a continuous fiber.

A cut surface of the fiber-reinforced resin material was observed at 100-times magnification with an electronic microscope. The observation showed that the resin penetrated into the central region of the bundle of carbon fibers.

The viscosity was measured with a B-type viscometer (a TVB-15 viscometer manufactured by TOKI SANGYO CO., LTD), using a rotor No. 20 at 12 rpm at a room temperature (15° C.).

Next, a plurality of the obtained fiber-reinforced resin materials in the form of chips were layered randomly in a mold, and were applied with heat of 200° C. and pressure of 20 MPa for 5 minutes using a vacuum press.

After this, an excess thermoplastic resin exuding from the mold form was removed. As a result, the molded fiber-reinforced resin body in the form of a plate having a thickness of 1.3 mm was obtained. The external appearance quality of the obtained molded fiber-reinforced resin body was favorable. A cross section of this molded fiber-reinforced resin body was observed at 50-times magnification with an electronic microscope. The observation showed that the inside of the molded fiber-reinforced resin body had no spaces. The Vf value of the obtained molded fiber-reinforced resin body was 55%.

Example 2

In Example 2, a molded fiber-reinforced resin body was obtained similarly as is the case with Example 1. However, in Example 2, the fiber-reinforced resin material in the form of a tape was cut in the direction nearly perpendicular to the axial direction of the carbon fibers in a manner that each cut had a length of 10 mm to 15 mm. Furthermore, in Example 2, each cut had a length of 10 mm to 15 mm, a width of 4 mm, and a thickness of 0.38 mm, and had a cross section in the shape resembling that of a flattened rugby ball. Note that the length of the carbon fiber in the obtained fiber-reinforced resin material was 10 mm to 15 mm, which was the same as the length of the fiber-reinforced resin material since the carbon fiber was a continuous fiber.

Example 3

In Example 3, as the bundle of reinforced fibers arranged in one direction, a bundle of 60000 carbon fibers was used (PAN-based carbon fiber filaments: PYROFIL #TRH50 60M manufactured by Mitsubishi Rayon Co., Ltd.).

The bundle of carbon fibers was drawn, without fiber opening processing, from a drum having this bundle of carbon fibers wound thereon, and a thermoplastic resin solution described below is applied to one surface of the bundle of carbon fibers using a kiss roll. A cross section of the bundle of carbon fibers drawn from the drum was in the shape resembling that of a flattened rugby ball.

[Themoplastic Resin Solution (Viscosity: 15 mPa · s or less [device measurement limit or less])]

| | |
|---|---|
| thermoplastic epoxy resin (reactive resin: DENATITE XNR6850V manufactured by Nagase ChemteX Corporation) | 100 parts |

-continued

[Themoplastic Resin Solution (Viscosity: 15 mPa · s or less [device measurement limit or less])]

| | |
|---|---|
| curing agent (DENATITE XNH6850V manufactured by Nagase ChemteX Corporation) | 6.5 parts |
| methyl ethyl ketone | 200 parts |

Next, the bundle of carbon fibers applied with the thermoplastic resin solution was squeezed by contact with four rolls (the top surface and under surface of the bundle of the carbon fibers alternately contacted with the corresponding rolls, each of the surfaces contacting the rolls twice). After this, the bundle underwent drying and heat treatment at the same time at 110° C. (a minimum temperature) to 160° C. (a maximum temperature) for 2 minutes. As a result of this, the fiber-reinforced resin material in the form of a tape was obtained. This fiber-reinforced resin material had a width of 5 mm to 10 mm and a thickness of 0.5 mm to 1.5 mm, and had the bundle of reinforced fibers arranged in one direction and applied with the reactive thermoplastic resin. The glass-transition temperature of the thermoplastic resin was 100° C.

Next, the fiber-reinforced resin material in the form of a tape was cut in the direction nearly perpendicular to the axial direction of the carbon fibers in a manner that each cut had a length of 20 mm to 30 mm. As a result, the fiber-reinforced resin materials in the form of chips were obtained. Each cut had a length of 20 mm to 30 mm, a width of 5 mm to 10 mm, and a thickness of 0.5 mm to 1.5 mm. The Vf value of the obtained fiber-reinforced resin material was 44% to 53%. Note that the length of the carbon fiber in the obtained fiber-reinforced resin material was 20 mm to 30 mm, which was the same as the length of the fiber-reinforced resin material since the carbon fiber was a continuous fiber.

A cut surface of the fiber-reinforced resin material was observed at 100-times magnification with an electronic microscope. The observation showed that the resin penetrated into the central region of the bundle of carbon fibers.

The viscosity was measured with a B-type viscometer (a TVB-15 viscometer manufactured by TOKI SANGYO CO., LTD), using 20 rotors at 60 rpm at a room temperature (15° C.).

Next, 360 grams of the obtained fiber-reinforced resin materials in the form of chips were layered randomly in a mold, and were applied with heat of 240° C. and pressure of 4 MPa at a degree of vacuum of −0.1 MPa for 30 minutes using a vacuum press.

After this, an excess thermoplastic resin exuding from the mold form was removed. As a result, the molded fiber-reinforced resin body in the form of a plate having a thickness of 25.5 mm, a vertical length of 95 mm, and a horizontal length of 95 mm was obtained. The external appearance quality of the obtained molded fiber-reinforced resin body was favorable. A cross section of this molded fiber-reinforced resin body was observed at 50-times magnification with an electronic microscope. The observation showed that the inside of the molded fiber-reinforced resin body had no spaces. The Vf value of the obtained molded fiber-reinforced resin body was 55%.

Comparative Example 1

In Comparative Example 1, the same thermoplastic resin solution as used in Example 1 was applied to a cloth obtained by opening the same carbon fibers as used in Example 1. Then, the cloth underwent drying and heat treatment. As a result, the molded fiber-reinforced resin body in the form of a plate was obtained. Furthermore, a plurality of such molded fiber-reinforced resin bodies were layered and applied with heat of 200° C. and pressure of 20 MPa for 5 minutes using a vacuum press. As a result, the molded fiber-reinforced resin body in the form of a plate having a thickness of 1.3 mm was obtained.

(Test)

Each of the molded fiber-reinforced resin bodies in the form of plates according to Examples 1 and 2 and Comparative Example 1 was cut into a square of 10 cm×10 cm, which was then hammered. As a result, the molded fiber-reinforced resin body according to Example 1 showed little change even after being hammered twice. The molded fiber-reinforced resin body according to Example 2 was deformed after being hammered once and slightly cracked in the corner of the deformed part. This cracking was like partially peeling off in layered flakes, and thus the cut surface of the cracked part was not sharp.

In comparison with this, the molded fiber-reinforced resin body according to Comparative Example 1 was not broken after being hammered the first time. However, this molded fiber-reinforced resin body was broken after being hammered the second time and, in addition, the sharp cut surface was exposed.

Moreover, the molded fiber-reinforced resin body according to Example 1 was subsequently hammered ten times. In this case, although deforming to an extent and exhibiting slight layered exfoliation, this molded fiber-reinforced resin body was not broken.

Furthermore, the compressive strength of the molded fiber-reinforced resin body in the form of a plate according to Example 3 was measured in the following method.

A test sample having four R10 corners was attached to a universal testing machine, and was applied with a load of 100 tons at a pressurization rate of one ton per second to measure a deformation of the test sample. The measurement result is shown in Table 1 below. It should be noted that the test was performed at a room temperature (25° C.) and that two test samples (Sample 1 and Sample 2) were prepared.

TABLE 1

| | | Sample 1 | Sample 2 |
|---|---|---|---|
| Before test | Vertical length (mm) | 95.4 | 95.2 |
| | Horizontal length (mm) | 95.4 | 95.2 |
| | Thickness (mm) | 25.01 | 25.06 |
| After test | Vertical length (mm) | 96.4 | 96.4 |
| | Horizontal length (mm) | 96.3 | 96.5 |
| | Thickness (mm) | 25.00 | 25.06 |

As a result of the compression test, the molded fiber-reinforced resin body according to Example 3 hardly deformed even after the compression test and was verified to have a superior compression strength (compressive resistance), as shown in Table 1.

The above result indicates the followings. Since each of the molded fiber-reinforced resin bodies according to Examples 1, 2, and 3 includes the reinforced-fiber bundles, in each of which the reinforced fibers are arranged in one direction and which are random in the fiber axial direction in three dimensions, the anisotropy is reduced and the strength is stabilized. In addition, the use of the thermoplastic epoxy resin as a material enables the molded fiber-reinforced resin body to be hard to break by absorbing or dispersing an applied force. In the event of fracture, a fracture surface is less likely to be exposed and a sharp fracture surface is thus suppressed.

As to the susceptibility of the molded fiber-reinforced resin body to fracture, the molded fiber-reinforced resin body according to Example 1 that includes, as a raw material, the fiber-reinforced resin material having a longer length of 40 mm to 50 mm is less susceptible to fracture than the molded fiber-reinforced resin body according to Example 2 that includes the fiber-reinforced resin material having a length of 10 mm to 15 mm. To be more specific, the molded fiber-reinforced resin body according to Example 2 that includes the fiber-reinforced resin material having a shorter length is more susceptible to fracture than the molded fiber-reinforced resin body according to Example 1.

As described thus far, each of the molded fiber-reinforced resin bodies according to Examples (Examples 1, 2, and 3) includes the carbon fibers and the thermoplastic epoxy resins. On this account, the molded fiber-reinforced resin body is superior in productivity, light weight, and strength and has durability with no anisotropy. In addition, even after curing, the molded fiber-reinforced resin body can be changed in shape again.

Furthermore, since each of the molded fiber-reinforced resin bodies according to Examples includes the reactive thermoplastic epoxy resin, the epoxy resin can be impregnated deep into the bundle of carbon fibers. Thus, the molded fiber-reinforced resin body can exhibit a stable strength. Moreover, since the molded fiber-reinforced resin body includes the reinforced-fiber bundles, in each of which the reinforced fibers are arranged in one direction and which are random in the fiber axial direction in three dimensions, the anisotropy is reduced and the strength is stabilized. Even in the event that a great force is applied, the molded fiber-reinforced resin body is less susceptible to fracture. Moreover, even when the molded fiber-reinforced resin body is fractured, high safety is ensured. In addition, each of the molded fiber-reinforced resin bodies according to Examples is superior in compressive resistance and thus can be used for, for example, a jack plate that is applied with a great pressure.

The invention claimed is:

1. A fiber-reinforced resin material comprising a thermoplastic resin and a bundle of reinforced fibers arranged in one direction,
   wherein the thermoplastic resin is a reactive epoxy resin that, after reaction, is a phenoxy resin,
   wherein the fiber-reinforced resin material has a thickness of at least 0.3 mm,
   wherein the fiber-reinforced resin material is thermoplastic,
   wherein the fiber-reinforced resin material has a form of any one of a tape, a pillar, a string, a grain, or a chip,
   wherein a ratio of the length of the fiber-reinforced resin material in a fiber axial direction to a width of the fiber-reinforced resin material is at least 1.5 and at most 20.0, and
   wherein the fiber-reinforced resin material is not a laminate but is a single layer.

2. The fiber-reinforced resin material according to claim 1,
   wherein the reinforced fibers are carbon fibers.

3. The fiber-reinforced resin material according to claim 1, having a length of 5 mm to 500 mm in a fiber axial direction.

4. The fiber-reinforced resin material according to claim 3, having a width of at least 1 mm and at most 100 mm.

5. The fiber-reinforced resin material according to claim 1, wherein the bundle of reinforced fibers includes at least 1000 reinforced fibers.

6. The fiber-reinforced resin material according to claim 1, having a fiber volume fraction (a Vf value) of 20% to 80%.

7. A molded fiber-reinforced resin body comprising the fiber-reinforced resin material according to claim 1.

8. The molded fiber-reinforced resin body according to claim 7, having a fiber volume fraction (a Vf value) of 20% to 80%.

9. The molded fiber-reinforced resin body according to claim 7,
wherein the bundle of reinforced fibers is in strip form.

10. A molded fiber-reinforced resin body obtained by applying heat and pressure to the fiber-reinforced resin material according to claim 1.

11. A method of manufacturing the fiber-reinforced resin material according to claim 1, the method comprising:
applying, to the bundle of reinforced fibers, a thermoplastic resin solution including the thermoplastic resin and a solvent for at least one of dissolving and dispersing the reactive thermoplastic resin; and
performing at least one of drying and heat treatment after the applying.

12. The fiber-reinforced resin material according to claim 1, having a width of at least 1 mm and at most 300 mm.

13. The fiber-reinforced resin material according to claim 1,
wherein the thermoplastic resin has a glass-transition temperature after reaction of 90° C. to 200° C.

14. The fiber-reinforced resin material according to claim 1,
wherein the thermoplastic resin after reaction and curing has a linear molecular structure.

15. A molded fiber-reinforced resin body having a multilayer structure in which a plurality of bundles of reinforcing fiber, each being the bundle of reinforced fibers included in the fiber-reinforced resin material according to claim 1, randomly overlap one another in three dimensions.

16. A fiber-reinforced resin material for a molded fiber-reinforced resin body, the fiber-reinforced resin material comprising a thermoplastic resin and a bundle of reinforced fibers arranged in one direction,
wherein the thermoplastic resin is a reactive epoxy resin that, after reaction, is a phenoxy resin,
wherein the fiber-reinforced resin material has a thickness of at least 0.3 mm,
wherein the fiber-reinforced resin material is thermoplastic,
wherein a ratio of the length of the fiber-reinforced resin material in a fiber axial direction to a width of the fiber-reinforced resin material is at least 1.5 and at most 20.0, and
wherein the fiber-reinforced resin material is not a laminate but is a single layer.

* * * * *